Sept. 7, 1926.  K. WARD  1,598,947

VEHICLE BUMPER

Filed Jan. 25, 1924

Inventor
Kenneth Ward
By his Attorneys

Patented Sept. 7, 1926.

1,598,947

UNITED STATES PATENT OFFICE.

KENNETH WARD, OF JACKSON, MICHIGAN.

VEHICLE BUMPER.

Application filed January 25, 1924. Serial No. 688,468.

This invention relates to vehicles, and is illustrated as embodied in a Cadillac automobile having wing bumpers protecting its rear fenders.

An object of the invention is to provide simple but efficient means for supporting such bumpers on the chassis frame. In one desirable arrangement, each bumper, shown as comprising a pair of vertically spaced loops formed of flat spring bars, is carried by a novel bracket secured to the rear cross member of the chassis frame. Preferably, the bumper is held rigidly by clamping the ends of the spring bars between a pair of clamp plates, one of which may be the bracket.

Figure 1:
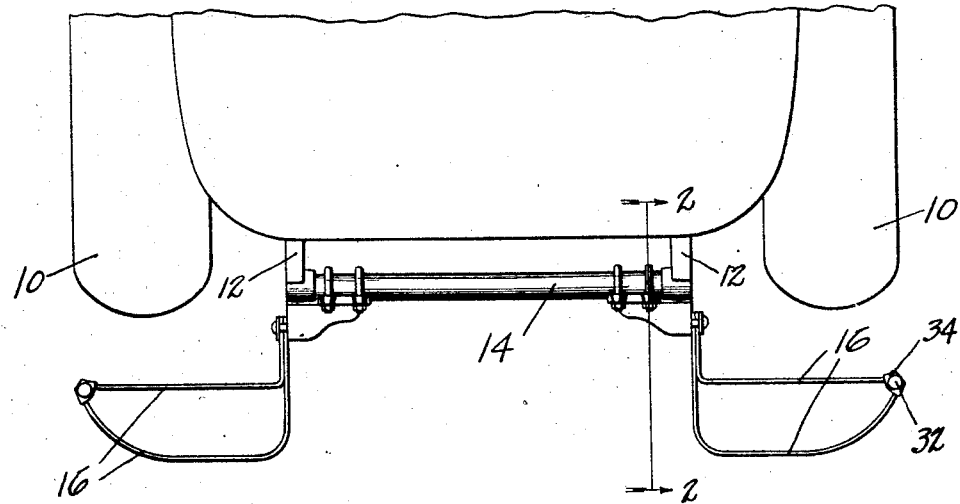
Figure 3:
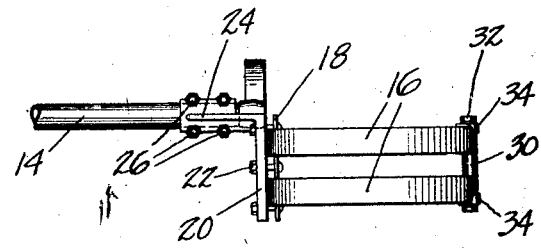
Figure 2:
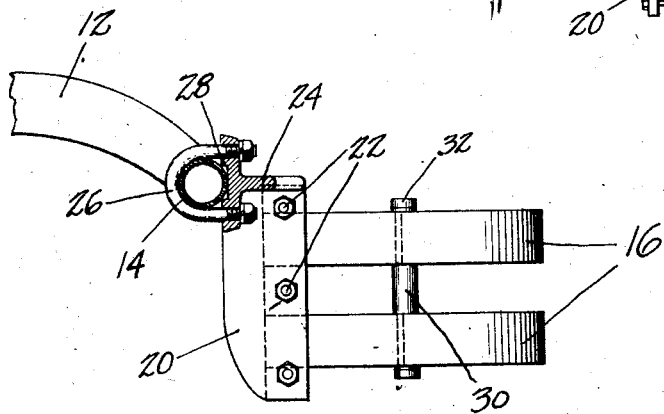

The above and other objects and features of the invention, including various novel combinations of parts and desirable particular constructions, will be apparent from the following description of one illustrative embodiment shown in the accompanying drawings, in which Fig. 1 is a top plan view of part of an automobile having the described wing bumpers;

Fig. 2 is a section on the line 2—2 of Fig. 1, showing the manner of supporting one of the bumpers; and Fig. 3 is a rear elevation of the parts shown in Fig. 2.

In the arrangement selected for illustration, the invention is embodied in an automobile having rear fenders 10, supported by a chassis frame having side members 12 and a tubular rear cross member 14. In order to protect the fenders without substantially obstructing the space between them, in which a tire carrier is usually arranged, a quarter or wing bumper 16 is supported at each side of the frame.

Each wing bumper comprises impact members such as upper and lower loops of flat spring stock, the ends of each loop being superposed and held by a clamp consisting of two plates 18 and 20 held together by bolts 22. The plate 20 is in the form of a bracket having a head 24 engaging the cross member 14 and secured thereto by U-bolts 26, head 24 being provided with shoulders or teeth 28 to grip the cross member and prevent turning. The outer ends of the loops are held in vertically-spaced relation by a device including a sleeve or bushing 30 between the loops, through which passes a clamping bolt 32 which also holds hook-shaped washers or clamps 34 respectively against the top edge of the top loop and the bottom edge of the bottom loop.

While one illustrative embodiment of my invention has been described, it is not my intention to limit its scope to that embodiment, or otherwise than by the terms of the appended claims.

I claim:

1. A vehicle comprising, in combination, a chassis frame including side members and a connecting rear cross member, fenders carried by the frame, a pair of wing bumpers arranged on opposite sides of the car to protect the fenders without obstructing the space between the fenders, a bracket for each bumper carried by the rear cross member and a plate secured to each bracket and cooperating with the bracket to hold the bumper clamped in place.

2. A vehicle comprising, in combination, a chassis frame, a pair of wing bumpers, each including a pair of vertically-spaced loops formed of flat spring bars, and a device for supporting each bumper on the frame, each device including a pair of plates and connecting bolts clamping the plates against opposite sides of the ends of said bars.

3. A vehicle comprising, in combination, a chassis frame including side members and a connecting rear cross member, a pair of brackets secured to and depending from said cross member at its opposite ends, and a double-bar wing bumper carried by each bracket.

4. A vehicle comprising, in combination, a chassis frame including a cylindrical cross member, a bumper, a bracket carrying the bumper having a part formed with gripping teeth engaging the cross member, and clamping means holding said part against the cross member.

5. A wing bumper comprising, in combination, vertically-spaced impact members, each in the form of a loop of flat spring stock with its ends superposed, and clamping means holding both loops by engagement with the superposed ends.

In testimony whereof I affix my signature.

KENNETH WARD.